United States Patent
Zoppas et al.

(10) Patent No.: US 12,383,096 B2
(45) Date of Patent: Aug. 12, 2025

(54) METHOD AND DEVICE FOR DETECTING THE AMOUNT OF LIMESCALE IN LIQUID HEATING DEVICES

(71) Applicant: I.R.C.A. S.P.A. INDUSTRIA RESISTENZE CORAZZATE E AFFINI, Vittorio Veneto (IT)

(72) Inventors: Federico Zoppas, Treviso (IT); Antonio De Moliner, Oderzo (IT); Christian Bortoluzzi, Godega di Sant'Urbano (IT); Christian Ceotta, Miane (IT); Roberto Oboe, Vicenza (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 518 days.

(21) Appl. No.: 17/755,810

(22) PCT Filed: Nov. 11, 2020

(86) PCT No.: PCT/IB2020/060596
§ 371 (c)(1),
(2) Date: May 9, 2022

(87) PCT Pub. No.: WO2021/094931
PCT Pub. Date: May 20, 2021

(65) Prior Publication Data
US 2022/0400891 A1    Dec. 22, 2022

(30) Foreign Application Priority Data
Nov. 11, 2019   (IT) ................... 102019000020829

(51) Int. Cl.
A47J 31/52    (2006.01)
A47J 31/54    (2006.01)
(Continued)

(52) U.S. Cl.
CPC .......... *A47J 31/5253* (2018.08); *A47J 31/54* (2013.01); *A47J 31/60* (2013.01); *G01N 25/18* (2013.01); *A47J 31/545* (2013.01)

(58) Field of Classification Search
CPC ........ A47J 31/5253; A47J 31/54; A47J 31/60; A47J 31/545; G01N 25/18
See application file for complete search history.

(56) References Cited

U.S. PATENT DOCUMENTS 4,024,751 A * 5/1977 Potrzebowski ........ G01K 17/00
                                                                    374/43
11,366,075 B2 * 6/2022 Törnquist ............ A47L 15/4285
(Continued)

FOREIGN PATENT DOCUMENTS

DE     102006042902 A1    3/2008
EP         1129653 A1     9/2001
(Continued)

OTHER PUBLICATIONS

Patent Cooperation Treaty, International Search Report and Written Opinion for International Application No. PCT/IB2020/060596, mailed Jan. 22, 2021, 14 pages.

*Primary Examiner* — Laura Martin
*Assistant Examiner* — Philip L Cotey
(74) *Attorney, Agent, or Firm* — Stetina Garred Brucker & Newboles

(57) ABSTRACT

A method and device for detecting the amount of limescale that accumulates in liquid heating devices, in particular for heating water. The method is capable of establishing, through simple temperature measurements, if the amount of limescale deposited on the heater element of a device for heating liquids is such as to jeopardize the correct operation thereof and provides the user with information on the need to clean the aforesaid heater.

9 Claims, 7 Drawing Sheets

(51) Int. Cl.
*A47J 31/60* (2006.01)
*G01N 25/18* (2006.01)

(56) References Cited

U.S. PATENT DOCUMENTS

| | | | | |
|---|---|---|---|---|
| 2003/0202787 A1* | 10/2003 | Wu | .................. | A47J 31/545 |
| | | | | 392/467 |
| 2016/0066738 A1* | 3/2016 | Shibuya | ................ | F24C 15/327 |
| | | | | 126/369 |
| 2017/0108211 A1* | 4/2017 | Satoh | ...................... | F24H 1/145 |
| 2018/0073996 A1* | 3/2018 | Chattoraj | ............... | G01K 13/02 |
| 2018/0245865 A1* | 8/2018 | Chattoraj | ............... | G01K 7/021 |
| 2019/0010656 A1* | 1/2019 | Kim | ........................ | F22B 37/50 |
| 2019/0137140 A9* | 5/2019 | Hill | ......................... | F24H 15/31 |
| 2019/0269294 A1* | 9/2019 | Wecker | .................. | D06F 34/24 |
| 2020/0033277 A1* | 1/2020 | Törnquist | ............... | G01N 25/08 |
| 2022/0240714 A1* | 8/2022 | Kong | .................. | A47J 31/468 |

FOREIGN PATENT DOCUMENTS

| | | | |
|---|---|---|---|
| FR | 2793400 | A1 | 11/2000 |
| WO | 9516378 | A1 | 6/1995 |

* cited by examiner

METHOD AND DEVICE FOR DETECTING THE AMOUNT OF LIMESCALE IN LIQUID HEATING DEVICES

CROSS-REFERENCE TO RELATED APPLICATIONS

This application claims priority to PCT International Application No. PCT/IB2020/060596 filed on Nov. 11, 2020, which application claims priority to Italian Patent Application No. 102019000020829 filed on Nov. 11, 2019, the disclosures of which are expressly incorporated herein by reference.

STATEMENT RE: FEDERALLY SPONSORED RESEARCH/DEVELOPMENT

Not applicable.

BACKGROUND OF THE INVENTION

Field of the Invention

The present invention relates to a method and device for detecting the amount of limescale that accumulates in liquid heating devices, in particular for heating water.

Background Art

Many applications of household appliances for dispensing hot beverages such as, for example, but not exclusively, espresso coffee machines, have the need for a given amount of water to be available at an optimal temperature and for the water temperature to be kept constant during the dispensing of the end product, e.g. coffee.

Apparatuses of this type are provided with heaters adapted to quickly heat the water so as to reduce the time required for dispensing the end product and the time interval between two successive dispensing operations. Moreover, these heaters generally are connected to an automatic switching OFF system which intervenes to switch OFF the household appliance should it not be used for a preset time. Examples of heaters employed for apparatuses of the aforesaid type are the so-called thermoblock heaters and the so-called flow-through heaters (FTHs).

The water in a thermoblock heater flows in a coil immersed in a solid metal block consisting of a material with increased thermal capacitance and conductivity so as to store a large amount of thermal energy which may be efficiently transferred to the water circulating in the coil.

The flow-through type of heaters, or FLHs, are formed by a metal body in which there are inserted a tube, inside of which the liquid to be heated may flow, and one or more resistors configured so as to heat the pipe, and therefore the liquid flowing therein.

In general, the heaters of the type described and the heaters of other type used to heat the water for household applications (coffee machines, boilers, etc.) are subject to the problem of limescale incrustations which form a hard, whitish and chalky patina, which is deposited on the surfaces of the heating element in contact with the water to be heated (for example, the electrical resistance of the heater or the pipe walls of the flow-through type heater) and may seriously limit or compromise the correct operation of the heater itself, thus limiting the transmission of the heat from the heater to the water to be heated.

To date, most machines used to heat water for domestic use, such as for example, small household appliances such as coffee machines, do not use additional sensors to understand how much limescale has accumulated on the heating element.

Commonly, the user is required to measure the hardness of the water used in the household appliance and, on the basis of these results, the household appliance is set so as to inform the user of the need to perform a descaling cycle on the household appliance heater. This procedure is comprehensibly approximated and does not provide any user feedback concerning the results of the descaling cycle performed.

Therefore, the need is apparent for a method for detecting the amount of limescale accumulated in the heaters of liquid heating devices—whether they are of the flow-through heater type or other type—so as to allow the user to best manage the efficiency of the aforesaid heaters while maintaining optimized conditions of use to ensure the correct heat exchange, and therefore the correct heating of the liquid to be heated both in terms of temperature and heating times.

BRIEF DESCRIPTION OF THE INVENTION

It is an object of the present invention to provide a method for detecting the amount of limescale accumulated in the heaters of liquid heating devices. Said method is adapted to provide accurate indications on the status of the heater and may advantageously be used to assess the current efficiency level of the heater and the need to subject the heater to a cleaning cycle to remove the excess limescale, for example in household appliances such as coffee machines. Moreover, the method according to the present invention may be used to establish the degree of efficiency of a cleaning cycle to which the heater was subjected so as to provide indications on the need to repeat the cleaning cycle itself or to perform it with different methods and duration.

The method according to the present description is based on measuring and subsequently processing the thermal rise of the water in output from the heater following the switching ON of the heater itself for a time interval of just a few seconds. The profile followed by heating the water provides the required information on how the heat transfer from the heater to the water is limited—with respect to the optimal—by the presence of limescale. Indeed, the limescale increases the thermal resistance of the system by lowering the overall gain of the heater, thus making the heater slower to increase the temperature of the water it is to heat.

The method the object of the present Patent Application exploits a similar approach to the one used for characterizing electric circuits by means of the response thereof to a voltage pulse in input. Substantially, a power pulse is provided to the system comprising the heater and the water (or the liquid) to be heated and the trend of the monitored amplitude is noted, here the temperature of the water (or of the liquid) in output from the heater.

Surprisingly, it has been noted that the characteristic trend of the response to the pulse of the system comprising the heater and the water is comparable to the response to the pulse of first order systems, therefore characterized by a given initial delay and by a successive exponential trend depending on the value of the thermal resistance of the system. Therefore, by means of a simple cleaning cycle applied to the heater, information may be obtained on the presence of limescale in the heater since the thermal resistance of the system increases as the amount of limescale increases, thus making the system itself slower and characterized by a smaller overall gain. By analyzing the thermal rise profile of the water in output from the heater during this short cleaning cycle, ultimately the state of health of the heater with respect to the accumulation of limescale therein is determined, signaling the need for further cleaning cycles or possible maintenance to restore the correct functionality and operation of the heater.

BRIEF DESCRIPTION OF THE FIGURES

Further features and advantages of the invention will become more apparent in light of the detailed description of preferred but not exclusive embodiments of a method for detecting the amount of limescale accumulated in the heaters of liquid heating devices, disclosed by way of a non-limiting example, with the aid of the accompanying drawings in which.

Figure 1:
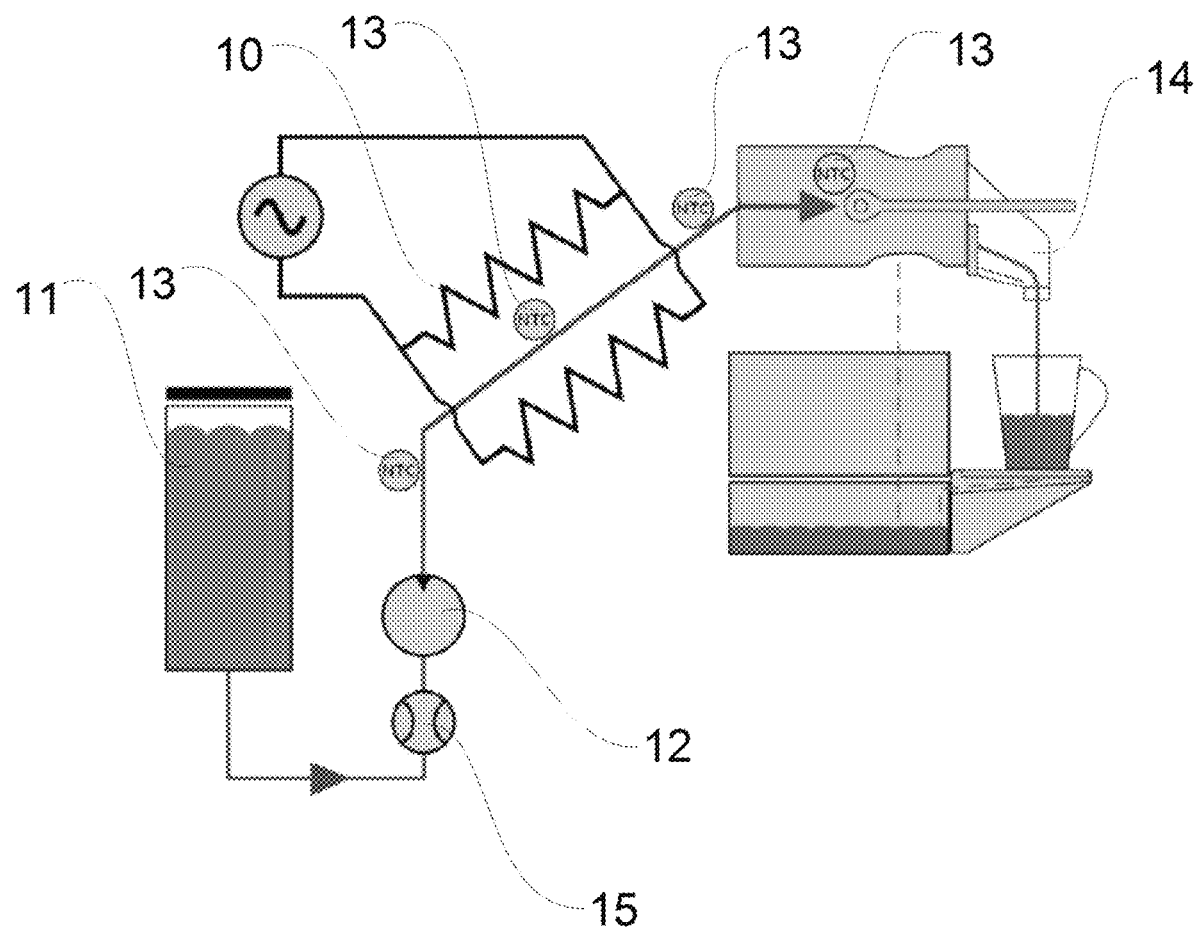
FIG. 1 shows a simplified functional diagram of a machine for making hot beverages.

The same reference numerals refer to the same elements or to elements having the same functional and/or structural features. When suitable, said elements are shown in the drawings with conventional symbols, showing only those specific details which are pertinent to understanding the embodiments of the present invention so as not to note details which are immediately apparent to those skilled in the art, with reference to the description herein indicated.

DETAILED DESCRIPTION OF THE INVENTION

Many household appliances for everyday use employ water which is suitably heated for use. An example of these household appliances are the machines for making espresso coffee.

Espresso coffee machines must generate hot water to make the beverage and therefore, are provided with a heater adapted to raise the temperature of a given amount of water in a given time. Most heaters employed in the aforesaid espresso coffee machines often exploit an electrical resistance put into direct contact with the water to be heated. Electric current flows through the resistance, which is heated and yields heat to the mass of surrounding water. Suitable thermal sensors detect the temperature of the water and disconnect the resistance from the power supply circuit thereof when the water has reached the preset temperature of use. At this point, the hot water is used by the hydraulic circuits of the coffee machine to make the desired infusion.

After a given time of use of the coffee machine, the water in which the electrical resistances of the heater are immersed tends to deposit a limescale layer, a hard, whitish and chalky patina on the aforesaid electrical resistances. This layer of limescale progressively increases in thickness and contributes to partially isolating the electrical resistance, thus decreasing the efficiency of heat transfer towards the surrounding water. For this reason, the water in the coffee machine progressively requires more time to reach a given temperature or reaches a lower temperature during a same heating time interval.

Therefore, there is a need to periodically clean the heaters of the coffee machines and the household appliances of this type. Said cleaning is to be performed effectively so as to return the heater as close to its starting conditions as possible. The method according to the present description is adapted to exactly determine the degree of limescale contamination in the heater so as to succeed in scheduling the cleaning cycles of the heater and cause the effective efficiency thereof.

With reference to FIG. 1 accompanying the present Application, a typical machine for making hot beverages provides a heater 10, for example a 1500 W flow-through type of heater (FTH), configured to heat the water—from a specific container 11 and conveyed towards the dispenser by a pump 12—up to reaching a predefined temperature which is considered optimal for making the hot beverage.

The structure of a typical machine for making hot beverages further provides at least one temperature sensor 13 positioned on the conduit which brings the heated water to the dispensing nozzle 14 of the machine, preferably at the output of the heating element.

Said thermal sensor may, for example be made by an NTC (negative temperature coefficient), a resistor the resistance value of which decreases with the temperature. The reading of the resistance value of the NTC—for example, by measuring the voltage at the ends thereof when it is powered by a current kept constant—provides information on the temperature of the components or of the area of the circuit with which the NTC is associated. By positioning the NTC (or the NTCs if a plurality of them is used) along the water conduit, an accurate estimate of the temperature that the water has reached may be obtained, and therefore the operation of the heater may be controlled in a suitable manner to reach the desired water temperature level.

In some cases, the machines for making hot beverages may further comprise, in the hydraulic circuit, a flowmeter 15, or flow rate gauge, adapted to provide information on the flow rate of heated water which is sent to the part of the machine in which the beverage to be dispensed is made. In the case of machines for making espresso coffee, the water flow rate is to be accurately regulated to promote the optimal performance of the forced percolation process which makes the beverage itself.

Measures performed on the typical thermal-hydraulic circuit of machines for making hot beverages have shown that the characteristic response trend of the system comprising the heater and the water to a power pulse in input is comparable to the response trend to the pulse of first order systems, therefore characterized by a given initial delay and by a successive exponential trend depending on the value of the thermal resistance of the system.

Figure 2:
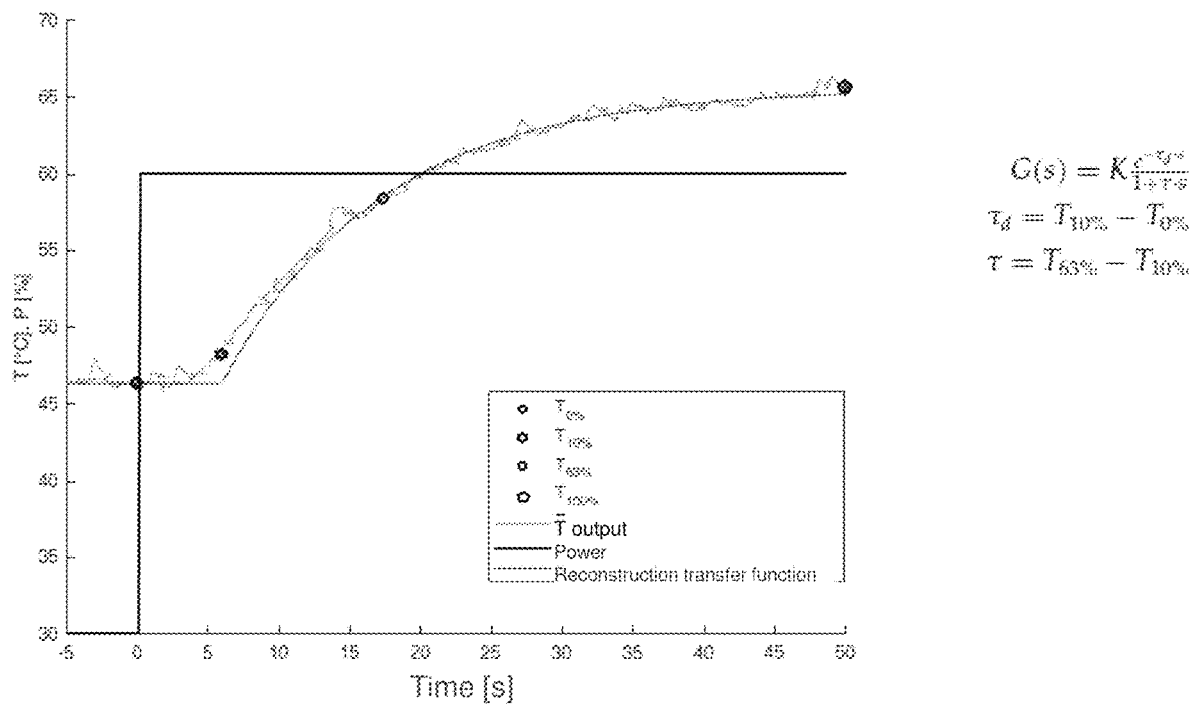
FIG. 2 shows the graph of the temperature trend of the water in output from the thermal-hydraulic circuit of a machine for making hot beverages in response to an impulsive stress in input.
Figure 3:
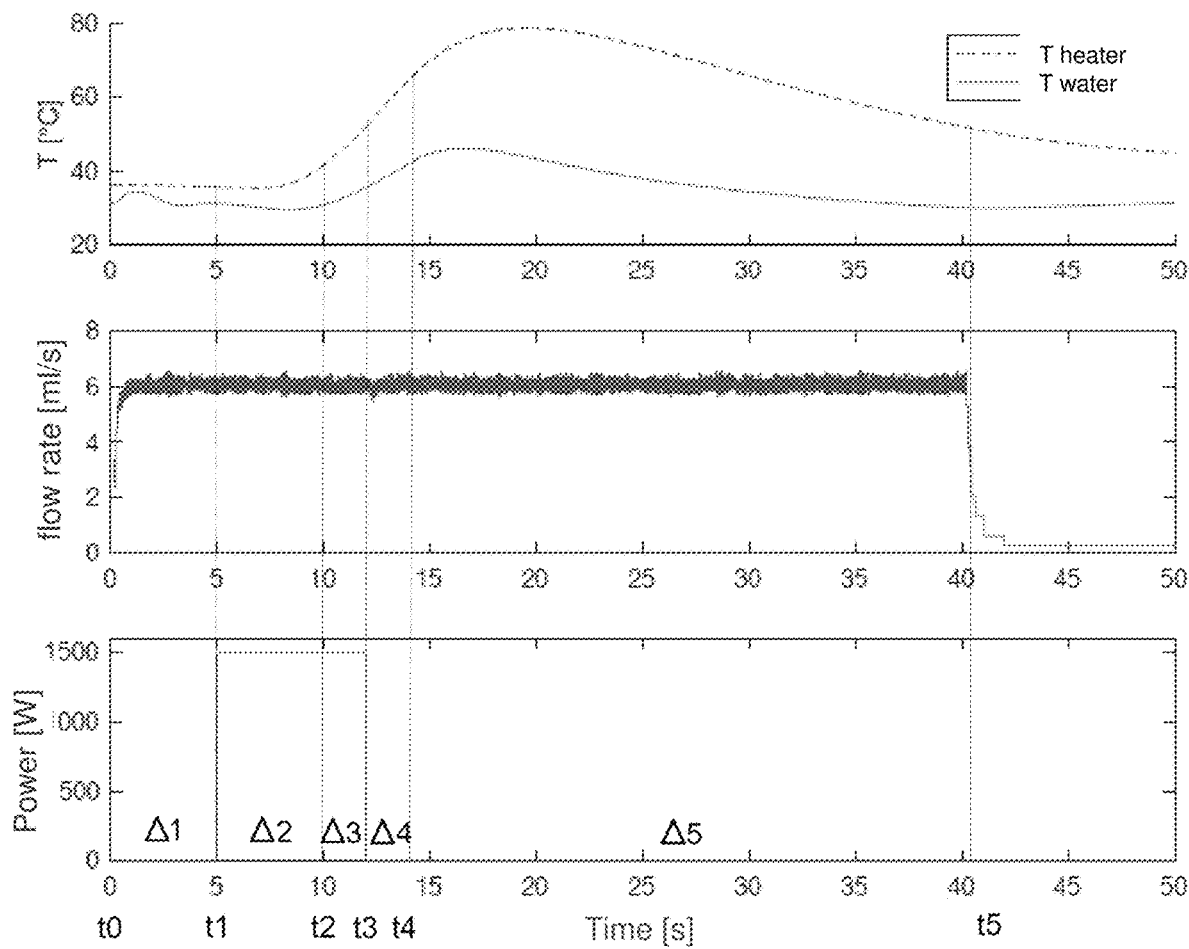
FIG. 3 shows the temperature trend of the heater and of the water in output from the thermal-hydraulic circuit of a machine for making hot beverages in response to an impulsive stress in input compared with the graphs of the flow rate of the water in the hydraulic circuit of said machine and of the impulsive stress in input.

Accompanying FIG. 2 shows the model of a typical FTH heater obtained through the aforesaid measures.

In detail, the model of the thermal-hydraulic circuit of a machine for making hot beverages is obtained by applying a power step 20 in input to heater 10 and measuring the corresponding thermal rise undergone by the water at the output of heater 10. The thermal rise of the water may, for example, be measured by exploiting the NTC already in the circuit of the machine.

The temperature curve obtained may be expressed in the Laplace domain, by the following formula:

$$G(S) = \frac{Ke^{-tds}}{1+tS}$$

where $t_d = t_{10\%} - t_{0\%}$ and $t = t_{63\%} - t_{10\%}$.

Amplitude G(s) expresses the transfer function of the system, i.e. the equation that expresses the relationship between the system input and output. The system gain instead is expressed by amplitude K which is calculated as the ratio between the temperature variation and the power variation that generated it, $K=\Delta T/\Delta P$. The delay time $t_d$ and the system time constant t instead are calculated according to the times required for the temperature of the water (or of the liquid) to reach 10% and 63%, respectively, of the temperature range $\Delta T$.

The response of the thermal-hydraulic circuit of a machine for making hot beverages to a pulse stress (the power step in input) has a characteristic response trend to the pulse of the first order systems, characterized by an initial delay and by an exponential trend, as shown in accompanying FIG. 2 of this Application. The aforesaid exponential trend comprises a first almost linear part and a second asymptotic part.

The possible accumulation of deposits of limescale on the heater element increases the thermal resistance and the thermal capacitance of the system, making the system itself slower and characterized by a smaller gain. In further detail, deposits of limescale on the heater act on the system, increasing the time constant t and decreasing gain K, while the delay time $t_d$ remains substantially unvaried, showing a much smaller percentage variation with respect to the corresponding variations undergone by the aforesaid parameters K and t.

Therefore, in the event of the presence of limescale, the curve obtained has a smaller peak value and a smaller initial leading edge slope with respect to the case of the absence of deposits of limescale on the heating element. This therefore allows estimating the level of limescale in the heater element by measuring the response of the thermal-hydraulic system of the machine for making hot beverages to a pulse stress. The amount of limescale deposited on the active surfaces of the heater may be estimated from the assessment of the slope and possibly the peak value of the measured temperature curve. The method according to the present description efficiently allows at least three levels to be discriminated, a low level of limescale, a medium level and a high level of limescale which requires a cleaning operation of the machine for making hot beverages.

Therefore, the method according to the present description provides to estimate the angular coefficient of the almost linear part of the curve relative to the temperature trend of the water after the heater was switched ON. The calculated estimation of the angular coefficient is then compared with a preset reference threshold and the entity of the deposit of limescale on the active surfaces of the heater is established on the basis of the results of the comparison.

By approximating the first almost linear part of the water temperature curve after the heater was switched ON with a straight line, we have that the angular coefficient m may be calculated by starting from the Cartesian coordinates of two points of the straight line: A $(x_A, y_A)$ and B $(x_B, y_B)$ so that $m=(y_B-y_A)/(x_B-x_A)$.

The aforesaid temperature curve refers to a temperature/time diagram, therefore more precisely, the aforesaid angular coefficient is expressed by $m=(T_B-T_A)/(t_B-t_A)$.

If we operate so as to measure the temperature value at the same instants, i.e. keeping $t_A$ and $t_B$ unvaried, the various angular coefficients measured under the various operating conditions of the heater are proportional to the difference in temperature measured: $m=\alpha(T_B-T_A)$ where $\alpha$ is a constant numerical value.

Therefore, conditions being equal (same heater, same hydraulic circuit, same household appliance), the measurement of the difference between the values of the temperature measured at the same instants is indicative of the angular coefficient of the temperature curve, and therefore of the estimation of the amount of limescale deposited on the heater.

A variation of the method according to the present description provides measuring the maximum temperature reached by the water, $T_{MAX}$, in a given reference time interval. Thereby, the initial profile of the temperature curve which culminates with the maximum temperature value reached is considered almost linear. Also in this case, a heater characterized by deposits of limescale is less efficient and therefore transfers less heat to the water which, in a given time interval, reaches a lower maximum temperature with respect to the case in which the heater is clean.

The analysis of the curve relative to the temperature trend of the water after the heater was switched ON further shows that the temperature of the water in output from the system has a transient during the initial delay time $t_d$ which is also partly dependent on the initial temperature of the heater. To avoid this initial transient from affecting the measurement and to make the method according to the present description independent from the initial conditions of the system and from the delay time $t_d$ (which substantially remains constant both in the presence and absence of limescale), the measurement adapted to establish the variation of the temperature of the system, and therefore the level of limescale present, is taken only after a given time from switching ON the heater. This time depends on the sizes of the system and the volume of water (or of liquid) involved. This time may be selected, for example more than or equal to 5 seconds, for small household appliances, such as, for example a machine for making hot beverages.

Measurements were taken on a plurality of heaters to fine-tune the method according to the present description. For each heater analyzed, first the system was characterized in the absence of limescale and then the measurements were repeated under different conditions of wear, and therefore of amounts of limescale deposited on the heater itself. Moreover, measurements were taken on heaters subjected to cleaning and decalcification processes to check if the method of the invention was capable of verifying the lowering of the amount of limescale detected. The measurements taken confirmed that the water is heated more slowly and the maximum temperature peak decreases following the same power pulse provided to the system in heaters with an increased level of limescale.

Figure 4:
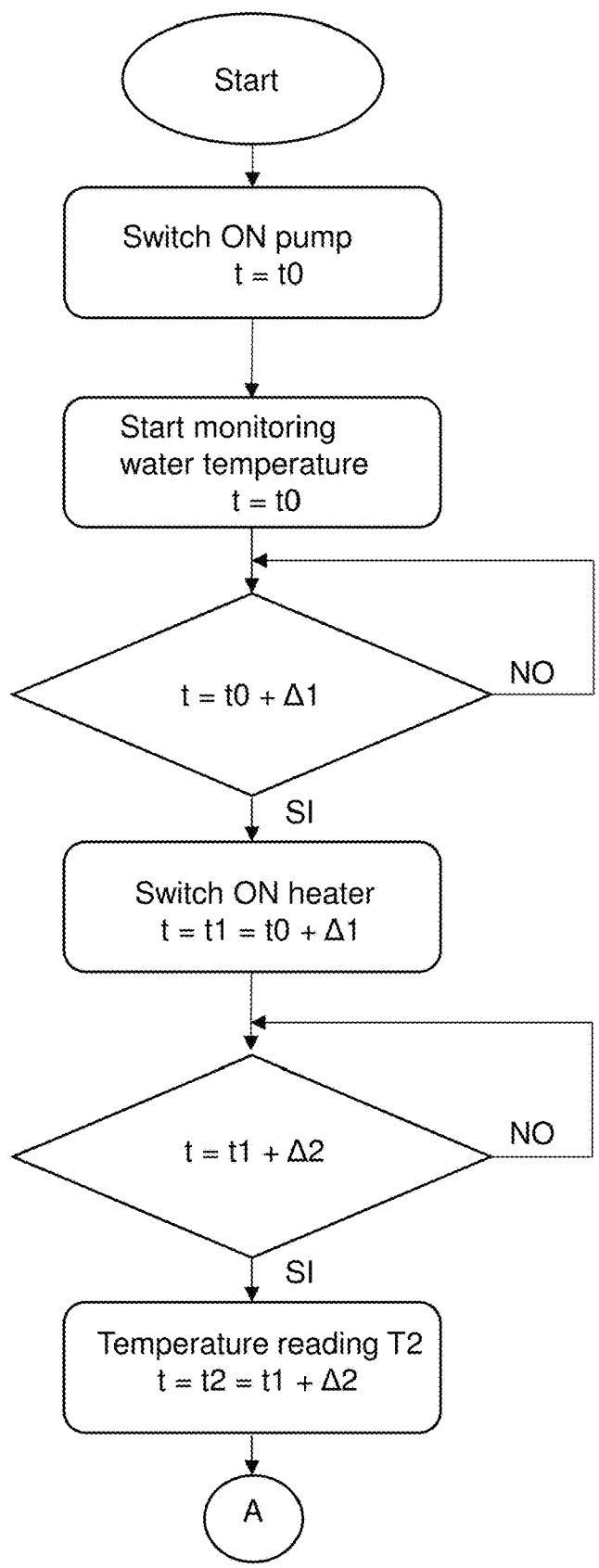
FIG. 4 shows the first part of the flow chart of a preferred embodiment of the algorithm executed by the method according to the invention.
Figure 5:
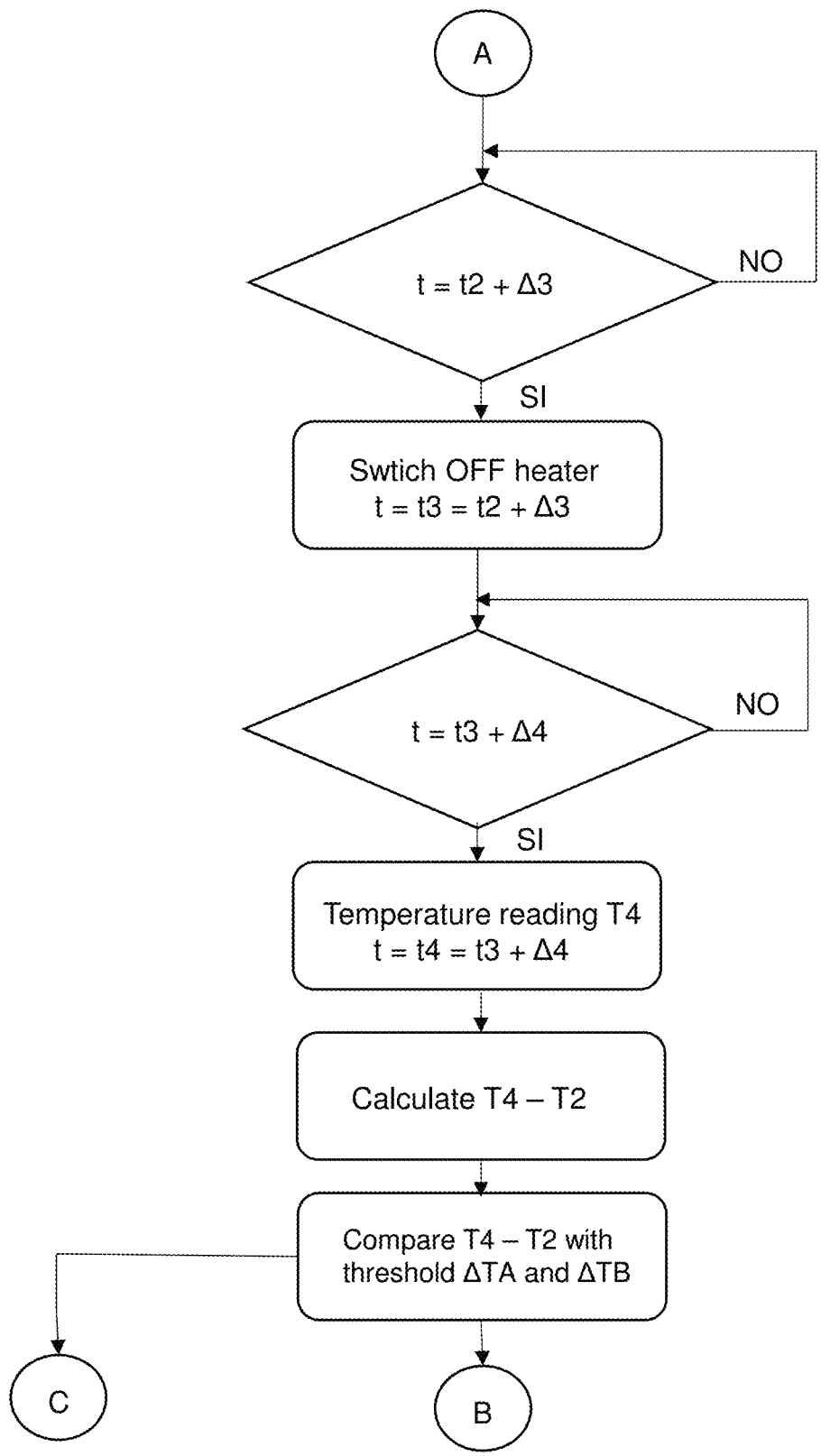
FIG. 5 shows the second part of the flow chart of a preferred embodiment of the algorithm executed by the method according to the invention.
Figure 6:
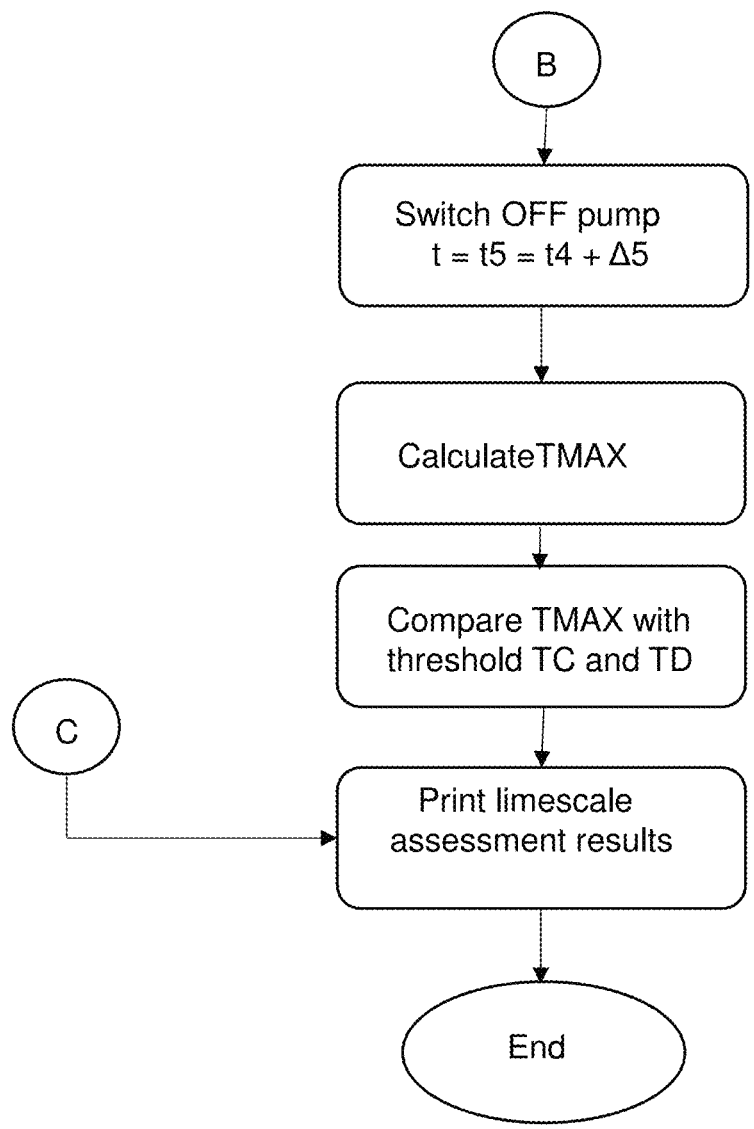
FIG. 6 shows the third part of the flow chart of a preferred embodiment of the algorithm executed by the method according to the invention.
Figure 7:
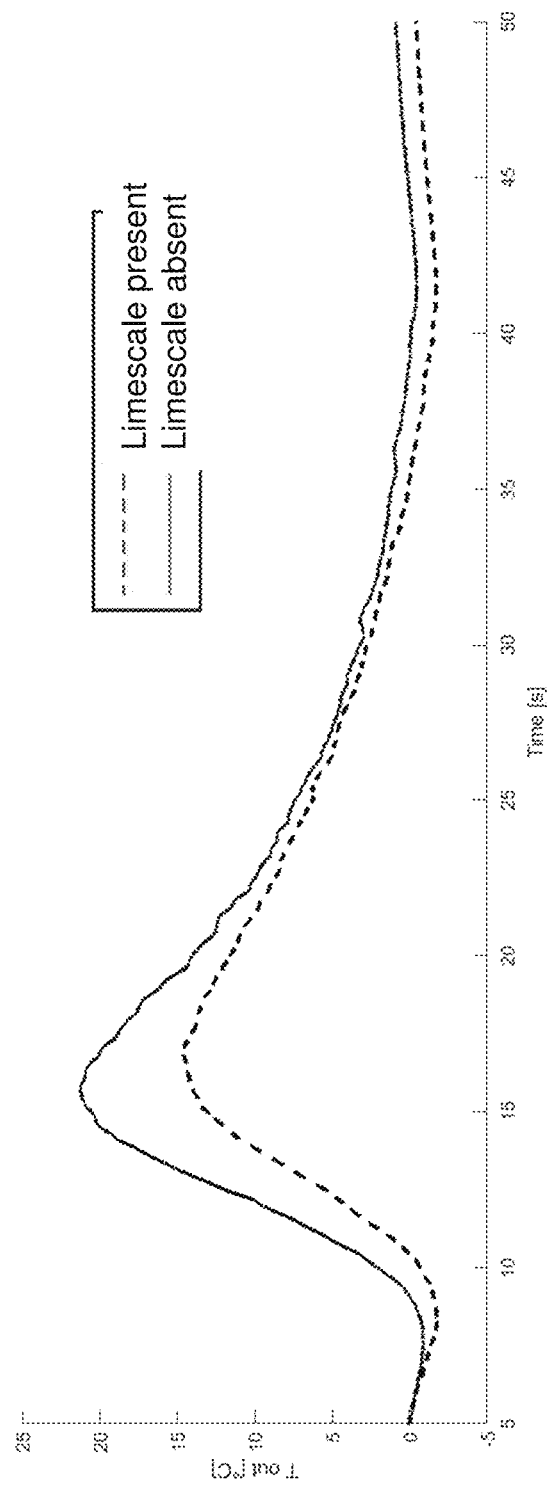
FIG. 7 shows the graph of the temperature trend of the water in output from the thermal-hydraulic circuit of a machine for making hot beverages in response to an impulsive stress in input in the cases in which: the heater is clean, the heater has deposits of limescale on the surface thereof.

Accompanying FIG. 4 shows a preferred embodiment of the algorithm which may be employed in the method according to the present invention.

Said algorithm provides the following steps:
Operating, at a time t0, the pump for circulating the water (or the liquid used) in the circuit of the heater so as to start a cleaning cycle of the household appliance in question;
Starting the monitoring of the water temperature;
Operating the heater at a preset power P0, after a first time interval Δ1, at a time t1=t0+Δ1. Said first time interval 1 may also be equal to zero, however Δ1 is preferably selected smaller than or equal to about 5 seconds in the case of small household appliances for making homemade hot beverages;
Measuring the temperature of the water T2 after a second time interval Δ2, at a time t2=t1+Δ2. In the case of small household appliances for making homemade hot beverages, said second time interval Δ2 may be selected smaller than or equal to about 5 seconds;
Storing the water temperature value T2 measured at time t2, in degrees centigrade;
Switching OFF the heater after a third time interval Δ3, at a time t3=t2+Δ3. In the case of small household appliances for making homemade hot beverages, said third time interval Δ3 may be selected smaller than or equal to about 2 seconds;
Measuring the water temperature value T4 after a fourth time interval Δ4, at a time t4=t3+Δ4. In the case of small household appliances for making homemade hot beverages, said fourth time interval Δ4 may be selected smaller than or equal to about 2 seconds.
Storing the water temperature value T4 measured at time T4, in degrees centigrade;
Switching OFF the water circulating pump after a fifth time interval Δ5, at a time t5=t4+Δ5;
Calculating $\Delta T_{t2-t4}$ of the water between times t2 and t4 as a difference between the stored values of the temperature values measured at the times t2 and t4;
Comparing $\Delta T_{t2-t4}$ with predetermined thresholds $\Delta T_A$ and $\Delta T_B$, so as to discriminate three cases:

$$\Delta T_{t2-t4} < \Delta T_A \qquad \text{a)}$$

$$\Delta T_A \leq \Delta T_{t2-t4} < \Delta T_B \qquad \text{b)}$$

$$\Delta T_{t2-t4} \geq \Delta T_B \qquad \text{c)}$$

Should, for example the aforesaid thresholds be selected as follows: $\Delta T_A=8°$ C., $\Delta T_B=11°$ C. (other thresholds are suitable in the case of different layouts and different systems), we have that:
In case a) the amount of limescale present on the heater is excessive and such as to affect the correct performance thereof, the heater needs cleaning.
In case b) the amount of limescale present on the heater is considerable but not yet such as to affect the correct performance thereof, the cleaning of the heater only is to be considered advisable.
In case c) the amount of limescale is small and the heater does not need cleaning.
The preferred values of the various parameters employed in the described preferred embodiment of the method according to the present description are to be considered indicative and relative to the specific case of small household appliances for making hot beverages. Other threshold values may obviously be selected in the case of systems having different features, both in terms of heater circuit and in terms of volume of water used.

Alternatively or additionally to measuring the temperature at instants t2 and t4 described above, the method according to the present description may provide the following steps:
Measuring the water temperature at preset intervals, from instant t1 and until instant t5 of switching OFF the water circulating pump;
Determining the maximum temperature value measured $T_{MAX}$;
Storing the maximum temperature value measured $T_{MAX}$;
Comparing $T_{MAX}$ with predetermined thresholds $T_C$ and $T_D$, so as to discriminate three cases:

$$T_{MAX} < T_C \qquad \text{d)}$$

$$T_C \leq T_{MAX} < T_D \qquad \text{e)}$$

$$T_{MAX} \geq T_D. \qquad \text{f)}$$

Should, for example the aforesaid thresholds be selected as follows: $T_C=13°$ C. and $T_D=16°$ C. we have that:
In case d) the amount of limescale present on the heater is excessive and such as to affect the correct performance thereof, the heater needs cleaning.
In case e) the amount of limescale present on the heater is considerable but not yet such as to affect the correct performance thereof, the cleaning of the heater only is to be considered advisable.
In case f) the amount of limescale is small and the heater does not need cleaning.
The preferred values of the various parameters employed in the described preferred embodiment of the method according to the present description are to be considered indicative and relative to the specific case of small household appliances for making hot beverages. Other threshold values may obviously be selected in the case of systems having different features, both in terms of heater circuit and in terms of volume of water used.

The power at which the heater is operated may be the maximum available to the apparatus in question or an intermediate power. The choice of a power value other than the maximum available one may have consequences on the choice of the times and the thresholds of the method according to the present description.

The invention claimed is:
1. A method for detecting deposits of limescale in liquid heating devices comprising a hydraulic circuit, at least one pump for circulating said liquid inside the hydraulic circuit, a heater for said liquid, and means for measuring the temperature of said liquid, said method comprising:
Operating, at a time t0, the pump for circulating the liquid;
Operating, after a first time interval Δ1, at a time t1=t0+Δ1, the heater at a preset power P0;
Measuring, after a second time interval Δ2, at a time t2=t1+Δ2, the liquid temperature, T2;
Storing the liquid temperature value, T2;
Switching off, after a third time interval Δ3, at a time t3=t2+Δ3, the heater;
Measuring, after a fourth time interval Δ4, at a time t4=t3+Δ4, the liquid temperature value, T4;
Storing the liquid temperature value, T4;
Switching off, after a fifth time interval Δ5, at a time t5=t4+Δ5, the liquid circulating pump;
Calculating the $\Delta T_{t2-t4}$ of the liquid as a difference between the stored values of the temperature values measured at the times t4 and t2, T4−T2;

Comparing $\Delta T_{t2-t4}$ with predetermined thresholds $\Delta T_A$ and $\Delta T_B$, so as to discriminate three cases:
a) $\Delta T_{t2-t4} < \Delta T_A$, in which case the amount of limescale present on the heater is excessive and such as to affect the correct performance thereof, the heater itself needs cleaning;
b) $\Delta T_A \leq \Delta T_{t2-t4} < \Delta T_B$, in which case the amount of limescale present on the heater is considerable but not yet such as to affect the correct performance thereof, the cleaning of the heater only is to be considered advisable;
c) $\Delta T_{t2-t4} \geq \Delta T_B$, in which case the amount of limescale is small and the heater does not need cleaning.

2. A method according to claim 1 comprising:
Measuring the liquid temperature at pre-set intervals, from the instant t1 of operation of the heater and until instant t5 of switching off the liquid circulating pump;
Determining the maximum temperature value measured $T_{MAX}$;
Storing the maximum temperature value measured $T_{MAX}$;
Comparing $T_{MAX}$ with predetermined thresholds $T_C$ and $T_D$, so as to discriminate three cases:
d) $T_{MAX} < T_C$, in which case the amount of limescale present on the heater is excessive and such as to affect the correct performance thereof, the heater itself needs cleaning;
e) $T_C \leq T_{MAX} < T_D$, in which case the amount of limescale on the heater is considerable but not yet such as to affect the correct performance thereof, the cleaning of the heater only is to be considered advisable;
f) $T_{MAX} \geq T_D$, in which case the amount of limescale is small and the heater does not need cleaning.

3. A method according to claim 2 wherein said predetermined thresholds $T_C$ and $T_D$ are equal to 8° C. and 11° C., respectively.

4. A method according to claim 1 wherein said predetermined thresholds $\Delta T_A$ and $\Delta T_B$ are equal to 13° C. and 16° C., respectively.

5. A method according to claim 1 wherein said temperature measuring means comprise an NTC.

6. A method according to claim 1 wherein said power P0 is the maximum power available for said heater.

7. A method according to claim 1 wherein said first time interval $\Delta 1$ is equal to 5 seconds, said second time interval $\Delta 2$ is equal to 5 seconds, said third time interval $\Delta 3$ is equal to 2 seconds, said fourth time interval $\Delta 4$ is equal to 2 seconds, and said fifth time interval $\Delta 5$ is greater than or equal to 20 seconds.

8. A device for detecting deposits of limescale in liquid heating devices comprising a hydraulic circuit, at least one pump for circulating said liquid inside the hydraulic circuit, a heater for said liquid, and means for measuring the temperature of said liquid, comprising control means configured to:
operating, at a time t0, the liquid circulating pump;
operating, after a first time interval $\Delta 1$, at a time $t1=t0+\Delta 1$, the heater at a pre-set power P0;
measuring, after a second time interval $\Delta 2$, at a time $t2=t1+\Delta 2$, the liquid temperature, T2;
storing the liquid temperature value, T2;
switching off, after a third time interval $\Delta 3$, at a time $t3=t2+\Delta 3$, the heater;
measuring, after a fourth time interval $\Delta 4$, at a time $t4=t3+\Delta 4$, the liquid temperature value, T4;
storing the liquid temperature value, T4;
switching off, after a fifth time interval $\Delta 5$, at a time $t5=t4+\Delta 5$, the liquid circulating pump;
calculating the $\Delta Tt2-t4$ of the liquid as a difference between the stored values of the temperature values measured at the times t4 and t2, T4−T2;
comparing $\Delta Tt2-t4$ with predetermined thresholds $\Delta TA$ and $\Delta TB$, so as to discriminate three cases:
a) $\Delta Tt2-t4 < \Delta TA$, in which case the amount of limescale present on the heater is excessive and such as to affect the correct performance thereof, the heater itself needs cleaning;
b) $\Delta TA \leq \Delta Tt2-t4 < \Delta TB$, in which case the amount of limescale present on the heater is considerable but not yet such as to affect the correct performance thereof, the cleaning of the heater only is to be considered advisable;
c) $\Delta Tt2-t4 \geq \Delta TB$, in which case the amount of limescale is small and the heater does not need cleaning.

9. A machine for preparing hot beverages, comprising a device for detecting deposits of limescale in liquid heating devices according to claim 8.

* * * * *